April 28, 1936.  W. G. WALL  2,039,041
INDIVIDUAL WHEEL MOUNTING
Filed March 29, 1934   3 Sheets-Sheet 2
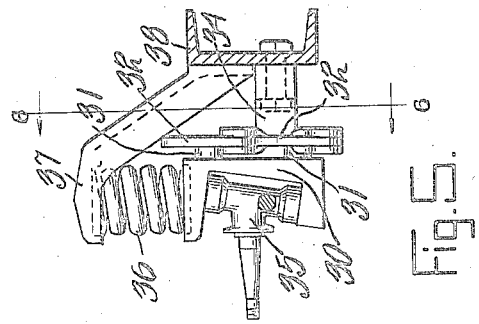
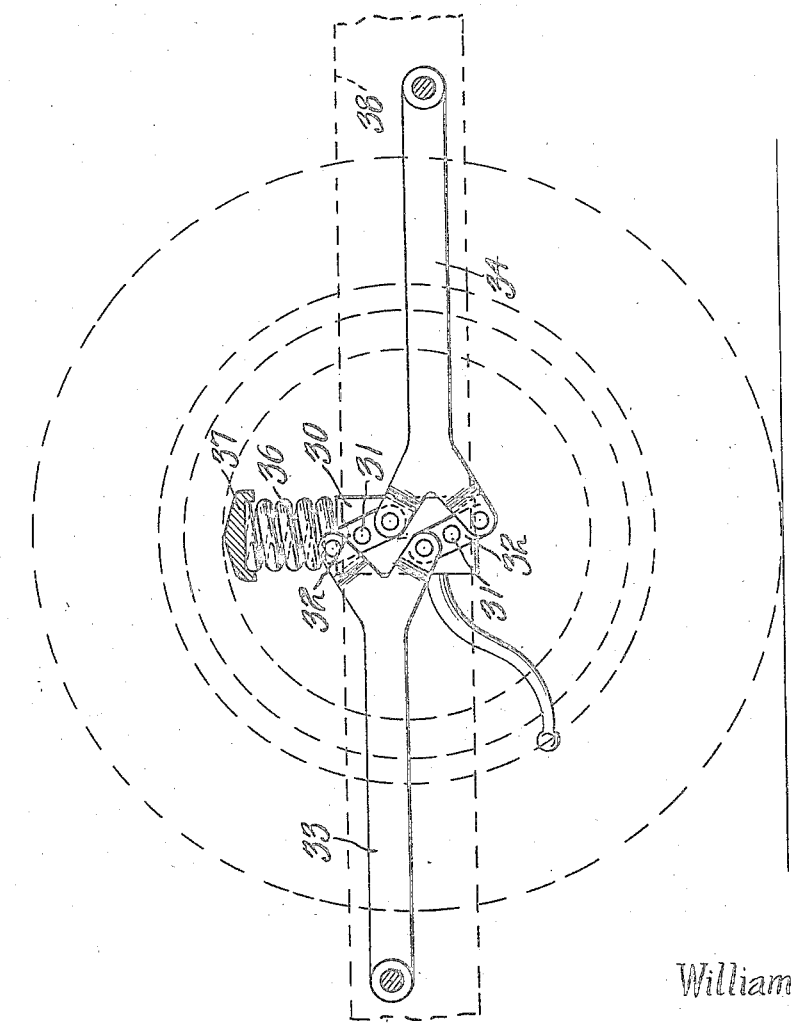
Inventor
William G. Wall

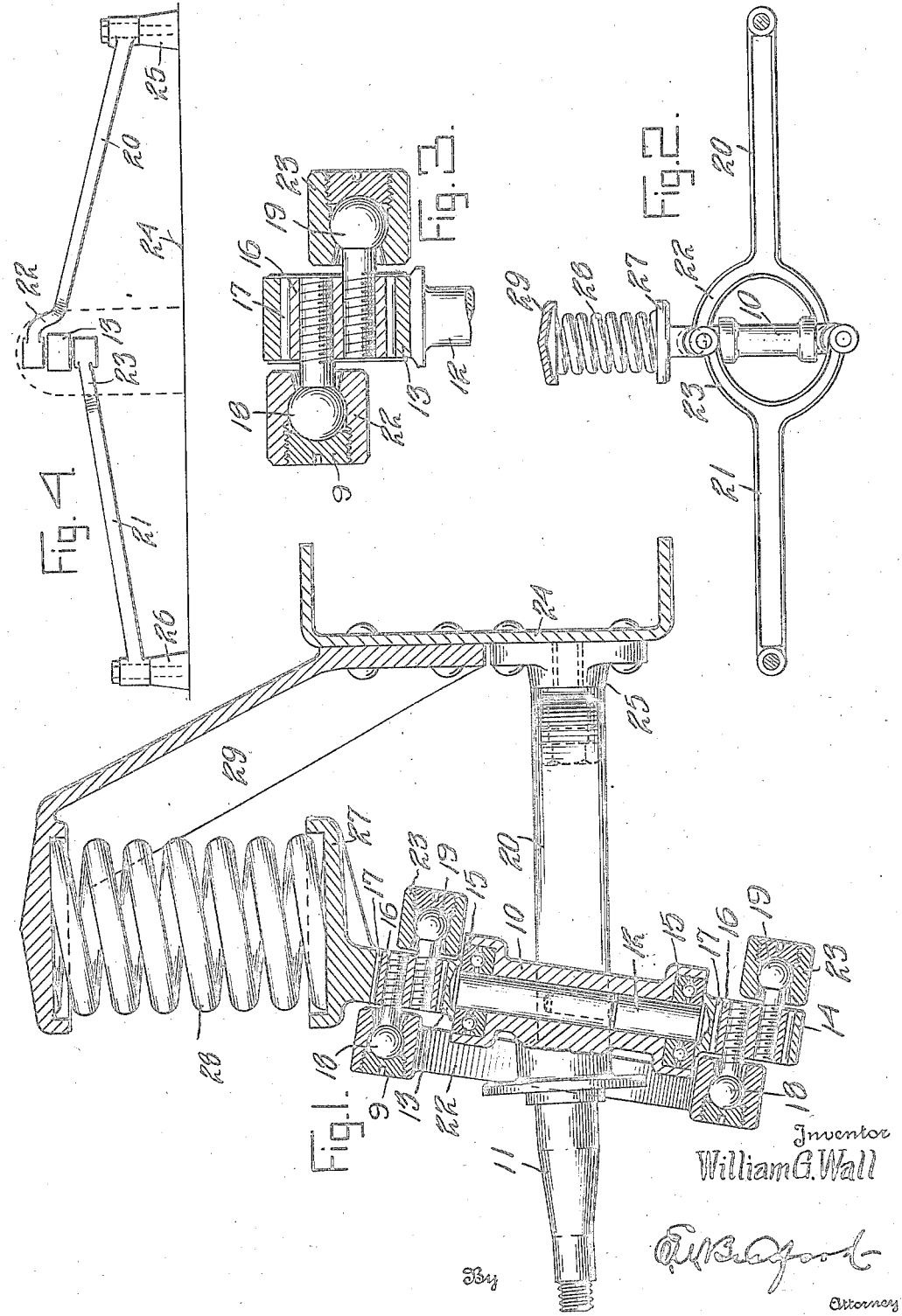

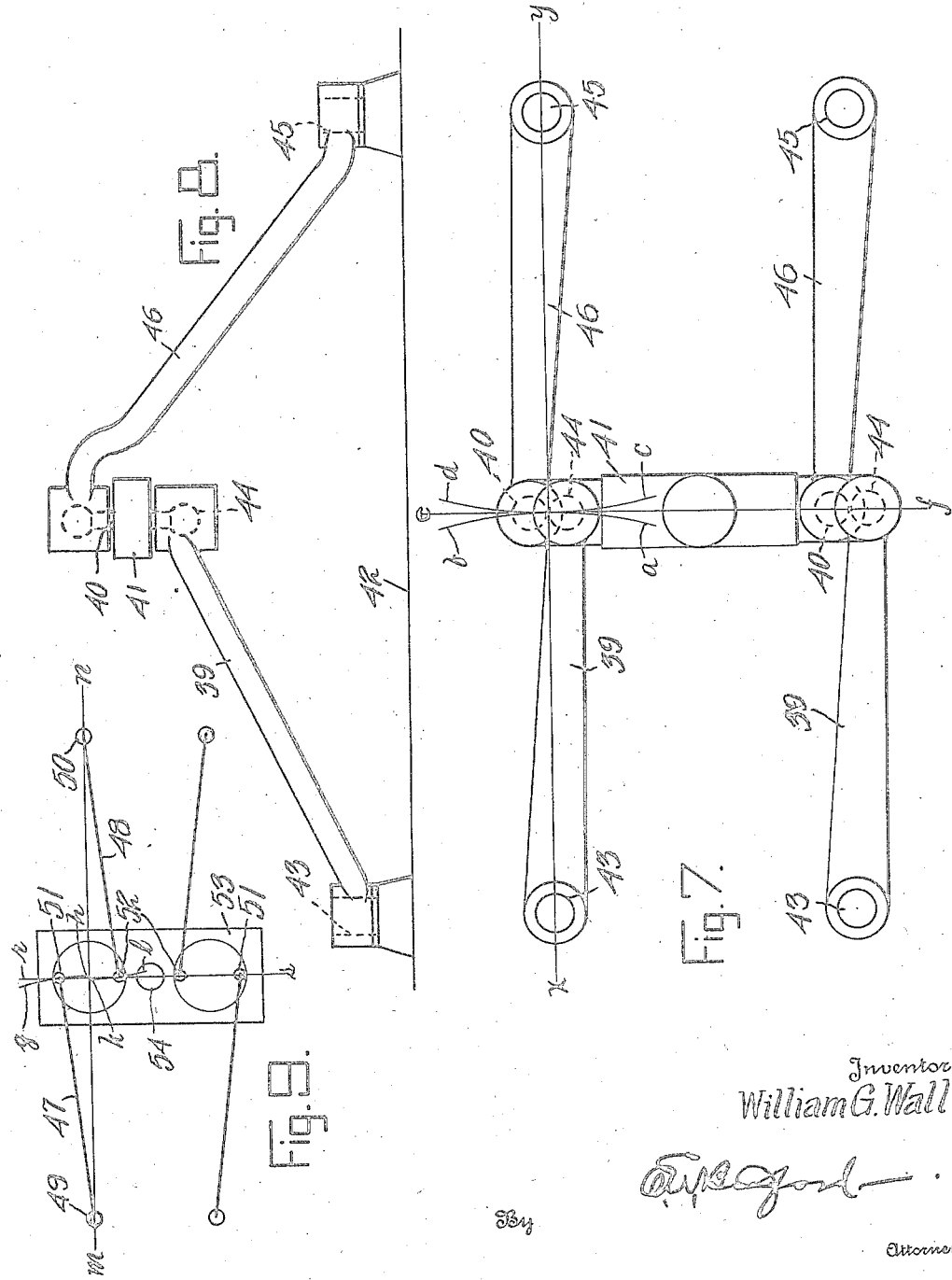

Patented Apr. 28, 1936

2,039,041

UNITED STATES PATENT OFFICE 2,039,041

INDIVIDUAL WHEEL MOUNTING

William G. Wall, Indianapolis, Ind.

Application March 29, 1934, Serial No. 718,005

8 Claims. (Cl. 267—20)

This invention relates to means for separately springing the front wheels of a motor vehicle and the object of the invention is to provide adequate spring suspension for the vehicle while maintaining proper wheel position at all times.

A further object is to provide structure for the suspension of the load on the springs as far out toward the wheels as is practically possible, all as will be hereinafter more fully described and claimed.

Referring to the accompanying drawings which are made a part hereof and on which similar reference characters indicate similar parts, Figure 1 is an end elevation in section of the device taken on a line through the steering knuckle, Figure 2 is a side elevation of the device as viewed from the side adjacent the vehicle frame, Figure 3 is a detail section view of a portion of Figure 1, Figure 4 is a plan view of the device, Figure 5 is an end elevation of a modified form of the invention, Figure 6 is a section on line 6—6 of Figure 5, Figure 7 is a diagrammatic side elevation of a modification of the device, and Figure 8 is a plan view of the modification disclosed in Figure 7.

Figure 9 is a diagrammatic side elevation of a still further modification.

In the drawings reference character 10 indicates the steering knuckle of a motor vehicle provided with a spindle 11 on which the vehicle wheel is mounted. The steering knuckle pin 12 may be formed of two parts which are provided with heads 13 and 14 on their outer ends and are connected in any suitable manner at their inner ends in the steering knuckle. As shown in Figure 1, the upper part is provided with a socket and the lower end with a projection which seats in and may be threaded into the socket. The heads 13 and 14 are seated on thrust bearings 15 positioned in the steering knuckle 10 which permits the pin to rotate relative to the steering knuckle.

The heads formed on the steering knuckle pin are each provided with a circular opening in which a compensating block 16 is secured and rotatably mounted on a bearing 17 and which blocks are provided with stub shafts 18 and 19 fixed to extend from the opposite sides thereof and positioned at right angles to the steering knuckle pin. These stub shafts may be provided with balls formed on their outer ends to which lever arms 20 and 21 are connected. The arms 20 and 21 are provided with forked ends 22 and 23, having sockets into which the enlarged ends of the stub shafts seat, the ends being held on the shafts by threaded plugs 9. The arms 20 and 21 are pivotally connected at their other ends to the frame 24 of the vehicle, on posts 25 and 26, respectively, which are fixed in any suitable manner to the frame 24.

The head 13 is further provided with an extension 27 on which a spring 28 seats. The weight of the vehicle is carried on the spring and is supported from the frame by a bracket 29 fixed thereto in any suitable manner.

Figure 5 shows a modified form of the invention in which the steering knuckle yoke 30 is provided with projecting pins 31 on which short links 32 are pivotally mounted at their centers with the corresponding ends of each connected by the forked ends of the lever arms 33 and 34. The other ends of the lever arms are connected to the frame 38 of the vehicle in the manner described in reference to Figure 1. The steering knuckle 35 is mounted in the yoke 30. The weight of the vehicle is carried by the spring 36 mounted on the top of the yoke and under the outer end of the bracket 37 fixed at its other end to the frame 38 of the vehicle.

Figures 7 and 8 are diagrammatic views of a further modification showing particularly a new arrangement of the lever arms. Lever arms 39 and 46 are pivoted at 43 and 45 respectively to the frame of the vehicle. It will be seen that in this case four lever arms form the operative connection between the steering knuckle 41 and the frame of the vehicle. The lever arms 39 are pivotally attached to stub shafts 44 and lever arms 46 are pivotally attached to stub shafts 40. With the parts shown in the unsprung condition in Figure 7, a line x—y joining the pivotal points 43 and 45 will pass between and at equal distance from the centers of the stub shafts 40 and 44. When the lever arms 39 swing upward or downward the stub shafts 44 will follow arcs a—b. When the lever arms 46 swing about pivots 45 the stub shafts 44 will travel in arcs c—d. This will mean that shafts 40 and 44 will both have a slight movement to the right of a vertical line e—f when the lever arms move upwardly and a slight movement to the left when these arms move downwardly since shafts 40 lie above the line x—y and shafts 44 lie below these lines. This results in a slight movement fore and aft of the steering knuckle 41 upon swinging of the lever arms. The steering knuckle 41, however, at all times maintains its vertical position.

In the modification shown in Figure 9 lever arms 47 and 48 are pivotally attached at 49 and 50 to the vehicle frame. The inner ends of the lever arms 47 are pivoted to stub shafts 51 and the inner ends of lever arms 48 are pivoted to stub shafts 52. The stub shafts 52 lie between the stub shafts 51. The stub shafts 51 and 52 normally lie above and below a straight line m—n connecting pivotal points 49 and 50. When the lever arms 47 swing upwardly stub shafts 51 will travel in arcs g—h and when lever arms 48 move upwardly stub shaft 52 will travel in arcs k—l. When the lever arms 47 move upwardly the lower stub shaft 51 will move to the right of a vertical line r—s while the upper stub shaft 51 will move to the left of the vertical line r—s. When the lever arms 47 move upwardly the lever arms 48 also move upwardly and the upper stub shaft 51 moves to the left of the vertical line r—s and the lower stub shaft 52 moves to the right of the vertical line r—s. The result of these movements is that as the lever arms all move upwardly the steering knuckle 53 will change its angular position with respect to its center 54 but the center 54 will always move upwardly and downwardly in a vertical path. When the lever arms 47 and 48 swing downwardly the steering knuckle 53 will pivot clockwise about its center 54 but the center 54 will again move in a vertical straight line.

The devices may be mounted on a vehicle in the manner clearly shown in the drawings. When the wheel runs on an uneven surface the steering knuckle is moved up against the spring, absorbing the shock to the vehicle. The lever arms pivotally connected to the frame and to stub shafts or short links maintain the steering knuckle in a straight line direction without appreciable change in the caster movement of the wheel with respect to the frame. Any slight error in the straight line movement is compensated by the horizontal movement of the stub shafts in the blocks which rotate in the steering knuckle pin. With the arms mounted as shown, transverse movement is prevented as the arms resist any such movement due to the bouncing or springing of the wheel.

The use of the small links as shown in Figure 5 or the stub shafts shown in Figure 1, allows the wheel to move up and down without appreciable change in caster when employed with the lever arms swinging in parallel planes.

By using this construction the load may be suspended on the coil springs at considerable distance from the frame of the vehicle, and provides a suspension which permits the use of the regular drag link method of steering without introducing any detrimental effects. Conventional brake attachments can also be used.

Having thus fully described my said invention, what I claim as new and desire to secure by Letters Patent, is:

1. Means for separately mounting the front wheels of a motor vehicle comprising a wheel support, resilient means on said support for supporting the vehicle, an arm connected at one end to the frame with the other end resting on said resilient means to support said vehicle, means positioned at each end of said support adapted to be oscillated, levers pivotally connected to said last-named means and to said frame to permit relative vertical movement between said support and said frame and to prevent relatively lateral movement therebetween.

2. Means for separately mounting the front wheels of a motor vehicle comprising a wheel support including an axle, cushioning means positioned on said support substantially above said axle, an arm connected at one end to the frame with the other end resting on said cushioning means to support said vehicle, means mounted in each end of said support adapted to be oscillated, levers pivotally connected to said last-named means and to said frame to maintain relative straight line vertical movement between said support and said frame and to prevent relatively lateral movement therebetween.

3. An individual front wheel mounting for motor vehicles comprising a wheel support, resilient means positioned on said support, a bracket fixed to the frame of the vehicle mounted on said resilient means to support said vehicle, a compensating block rotatably mounted in each end of said support provided with projecting stub shafts, levers provided with yoked ends adapted to be pivotally mounted on corresponding shafts of each block and with the other end of said levers pivotally secured to said frame to permit said support to move in a straight line vertically without lateral movement.

4. An individual front wheel mounting for motor vehicles comprising a wheel support, a coil spring positioned on said support, a bracket fixed to the frame of the vehicle mounted on said resilient means to support said vehicle, a block rotatably mounted in each end of said support provided with projecting shafts, levers pivotally mounted at one end to the frame on opposite sides of the wheel support and provided with yoked ends connected to said shafts to prevent lateral movement of said support and to permit vertical movement of said support with respect to the frame.

5. An individual front wheel mounting for motor vehicles comprising a wheel support, cushioning means positioned on said support, a bracket fixed to the frame of the vehicle mounted on said cushioning means to support said vehicle, pins projecting from said support toward the frame, links pivoted at their centers on said pins, forked levers pivotally connected at one end to said links and at the other end to the frame on opposite sides of the wheel support to permit substantially straight line movement of said support and prevent lateral movement thereof.

6. An individual front wheel mounting for motor vehicles comprising a wheel support, a spring positioned on said support, an arm fixed to the frame of the vehicle mounted on said spring, pins extending from said support toward said frame on each side of the horizontal axis of said support, links pivotally mounted at their centers on said pins, levers provided with forked ends pivotally connecting the corresponding ends of said links and with the other ends pivotally connected to the frame on opposite sides of said support to permit swinging of the links about their horizontal axis so that the support will travel in a substantially straight line vertically without lateral movement with respect to the frame.

7. An individual front wheel mounting for a motor vehicle comprising a wheel support, a spring positioned on said support, a bracket on said spring connected to the frame for supporting the vehicle, compensating blocks rotatably mounted at each end of said support, shafts extending from each side of said blocks, levers pivotally connected to said frame on opposite sides of said support and to corresponding shafts on each block to permit relative vertical movement between said support and said frame and to prevent lateral movement therebetween.

8. The combination with a vehicle frame of a steering knuckle, a pair of lever arms pivotally connected to the vehicle frame at one end and pivoted to the steering knuckle at the other end, a second pair of lever arms pivoted to the frame at one end and to the steering knuckle at their other ends, the lever arms being so pivoted as to permit vertical movement of the steering knuckle, said steering knuckle being held at all times in a vertical position to permit a slight forward and aft movement during the swinging of the lever arms.

WILLIAM G. WALL.